Figure 1:
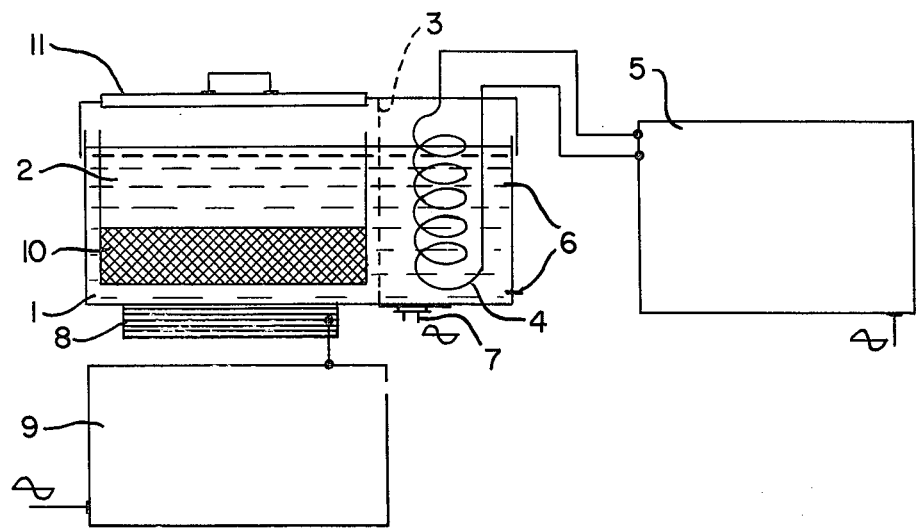

United States Patent [19]
Boucher

[11] 3,929,662
[45] Dec. 30, 1975

[54] LIQUID OR GAS PHASE STERILIZING AND CLEANING COMPOSITION CONTAINING AN ALDEHYDE AND A FLUORO OR PERFLUORO COMPOUND

[75] Inventor: Raymond Marcel Gut Boucher, New York, N.Y.

[73] Assignee: Wave Energy Systems Inc., New York, N.Y.

[22] Filed: Dec. 18, 1973

[21] Appl. No.: 425,881

[52] U.S. Cl. ............... 252/106; 252/188; 252/305; 424/333
[51] Int. Cl.² ........................................... C11D 3/48
[58] Field of Search ...... 424/333; 252/90, 106, 188, 252/305

[56] References Cited
UNITED STATES PATENTS

| 892,484 | 7/1908 | Wolfram | 252/106 X |
| 3,016,328 | 1/1962 | Pepper et al | 424/333 X |
| 3,282,775 | 11/1966 | Stonehill | 252/106 X |
| 3,697,222 | 10/1972 | Sierra | 424/333 X |
| 3,787,566 | 1/1974 | Gauvreau | 424/333 X |

*Primary Examiner*—Benjamin R. Padgett
*Assistant Examiner*—E. A. Miller
*Attorney, Agent, or Firm*—Shoemaker and Mattare, Ltd.

[57] ABSTRACT

Non aqueous sporicidal and sterilizing compositions for the treatment of inanimates and animate surfaces by means of fluoro or perfluoro carbon agents containing monoaldehydes or saturated dialdehydes with 2 to 8 carbon atoms. Said compositions can be used both for liquid or vapour phase processing. Liquid phase treatment exhibits an increased biocidal activity when combined with ultrasonic irradiation. Therapeutic uses of the new compositions are also described.

7 Claims, 2 Drawing Figures

LIQUID OR GAS PHASE STERILIZING AND CLEANING COMPOSITION CONTAINING AN ALDEHYDE AND A FLUORO OR PERFLUORO COMPOUND

The invention relates to novel cleaning and sterilizing compositions for the fast processing of objects such as medical, dental, surgical instruments, and for therapeutic applications such as topical aseptisation of wounds or skin. One of the main advantages of said new compositions in their possible use both in liquid and gas or aerosol phase.

The use of monoalkehydes and saturated dialdehydes as biocidal agents in aqueous or alcoholic solutions is known to the man of the art and clearly explicited in the following U.S. Pats.: R. E. Pepper et al (No. 3,016,328), A. A. Stonehill (No. 3,282,775), G. Sierra (No. 3,697,222) and R. M. G. Boucher (Pat. Appl. No. 155,233).

In these patents the aldehydes compounds are always acting in the presence of polar water molecules which affect both the aldehydes polymerization rate and the kinetic of adsorption at the interface of the processed material or body. It is well known that adding certain solvent molecules (such as methanol in the case of aqueous formaldehyde) to aldehydes compounds can decrease the aldehydes polymerization rate in aqueous solutions and thus increase the activity and shelf life of biocidal formulations. It is the object of the present invention to provide new biocidal solutions with an extended shelf life and an increased biocidal activity by completely eliminating polar water molecules from the sterilizing compositions and thus providing a maximum number of stable CHO radicals available to react with the microorganisms amine groups in nucleic acids or nucleo proteins.

It was previously disclosed by H. G. Bellinger (U.S. Pat. No. 3,357,922) that a mixture of saturated dialdehydes with cleaning solvents from the group consisting of lower aliphatic hydrocarbons, aromatic hydrocarbons and saturated aliphatic hydrocarbons, could disinfect under certain defined conditions (Disinfectants test of the German Society for Hygiene and Microbiology). As well known disinfectant tests conducted with bacteria such as *M. aureus*, *E. coli* or *Ps. aeruginosa* do not give any indication of a chemical lethal potency against highly resistant spores or vacuum dried bacterial spores.

To assess Bellinger's disinfectant formula against spores we used *B. subtilis* (ATCC 6051) as a test microorganism. In our laboratories *B. subtilis* was not inactivated on test pieces of wool when immersed for periods of 15 minutes and 1 hour at 37°C in a dry cleaning composition as described in the Bellinger's patent. The composition consisted of 5 g/l of glutaraldehyde plus 15 g/l of a non ionic surfactant (TERGITOL 15-S-12) in trichlorethylene. Sporostasis was, of course, noted where the wool test samples were merely rised with petroleum ether but where sterile 1% bisulphite was used to neutralize the dialdehyde after the specified contact periods in the dry cleaning composition, prolific bacterial growth occurred in the nutrient agar or broth cultures.

In other words, the compositions described in U.S. Pat. No. 3,357,922 are not sporicidal and therefore do not sterilize since by definition a chemical sterilant must destroy all forms of microorganisms including vacuum dried microbial spores. It is the object of the present invention to show that only certain specific fluoro or perfluoro carbons solvents combined with biocidal aldehydes can provide absolute sterilization as defined under the official regulations of the US Environmental Protection Agency (Ortenzio et al, J. Ass. Off. Agr. Chem. 36:480, 1953).

Neither lower aliphatic hydrocarbons, aromatic hydrocarbons or saturated aliphatic hydrocarbons without fluor in their molecules have shown sporicidal activity according to AOAC testing but fluoro and perfluoro carbons such as trichlorotrifluoromethane, trichloromonofluoromethane, tetrachlorodifluoromethane, or the perfluorocarbons such as FC-80 (mixture of perfluorobutyltetrahydrofuran with its isomers), FC-47 (perfluorotributylamine) or "Fluorinert" liquids (3M brand name) always exhibited a strong sporicidal activity when combined with methanal or aliphatic saturated dialdehydes containing from 2 to 8 carbon atoms. Let us recall that perfluorochemicals are organic compounds in which all hydrogen atoms have been replaced by fluorine while the term fluorocarbon refers to compounds having only fluorine and carbon in the molecule. These chemicals are not toxic and have been recently used in emulsion forms as potential blood substitutes (SCIENCE, 669, Feb. 16, 1973). Contrary to others, some of the perfluorochemicals used in the present invention leave the liver and spleen of the mouse in a matter of days. They are in particular the cis and trans perfluorodecalin (known as PP5) and a mixture of isomers of perfluoromethyldecalin (known as PP9).

Among the more potent aldehydes used in our experiments we shall mention: methanal, ethanedial, propanedial, butanedial, pentanedial and the iminodiacetaldehyde. The concentration by weight of the aldehydes generally varied between 0.005 and 3 per cent. Preferably it is recommended to work within the 0.1 to 2 per cent range.

Other advantages of the sterilizing compositions object of the present invention are the lack of corrosiveness, due to absence of water, the low toxicity, the non flammable characteristics and the small amount of residue left after processing. Any object immersed in the fluorinated sterilizing composition will dry instantaneously without leaving traces of contaminant or biocidal agent. This indeed is one important feature of the new compositions when processing medical or surgical devices which will later be in contact with the human body (cytoscopes, etc).

Figure 2:
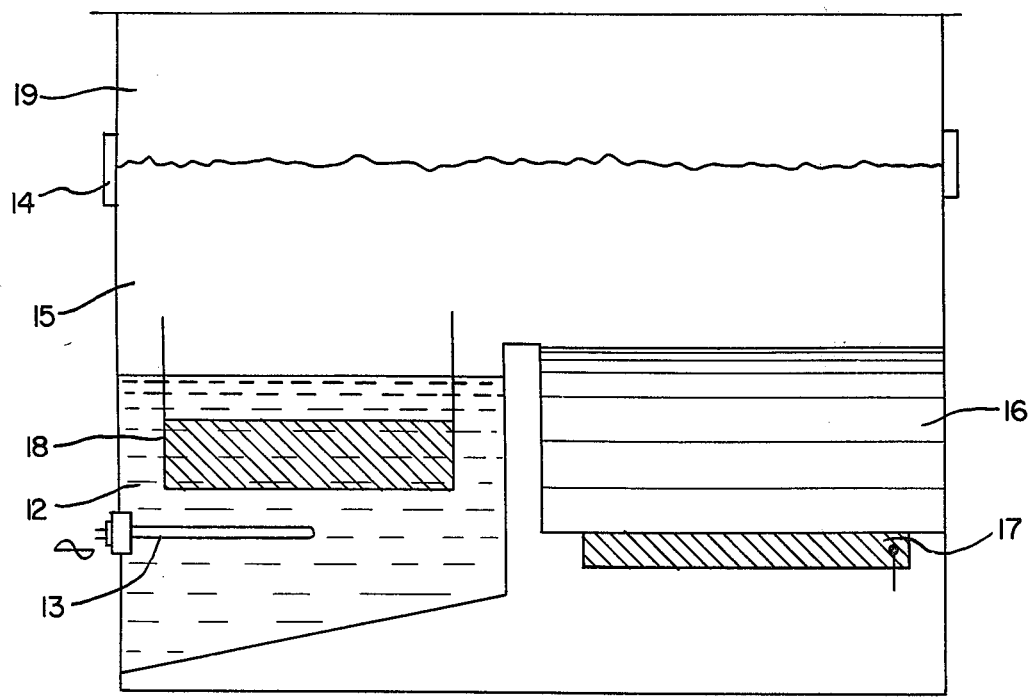

As an example, FIGS. 1 and 2 show two typical systems in which the new compositions object of the present invention have been successfully used for the sterilization of various instruments, surgical dressings, hospital disposables, etc.

The schematic on FIG. 1 shows a system which consists essentially of a covered metal or plastic container 1 filled with the sterilizing fluorinated composition 2. The container is divided in two sections by a perforated plate 3. On the right side of the plate a coil 4 containing a refrigerated liquid in motion cools down the temperature of the liquid and maintains it at the desired level. The coil is connected to the refrigeration unit 5 whose automatic functioning is monitored by two heat sensors 6.

At the bottom of the container there are an electrical heating element 7 and several transducers 8 which convert the high frequency electrical current produced by the generator 9 into ultrasonic energy. Ultrasonic waves emitted by the transducers propagate into the liquid compositions to uniformize the temperature, accelerate cleaning and improve the sterilizing mechanisms. The parts to be processed are generally placed into a perforated basket 10 which is immersed in the liquid phase. A removable lid is placed on the left side portion of the container to avoid liquid evaporation in the atmosphere. After processing one opens the lid 11 and lifts the basket which then contains cleaned dried sterilized parts objects or instruments.

If conducting some therapeutic treatments with the same apparatus, the lid remains open and the patient can expose the wound or skin area to the antiseptic composition with or without ultrasonic irradiation.

The system shown on FIG. 2 enables handling a three step treatment which successively consists of precleaning, sterilizing in the fluorinated liquid composition (activated or not by ultrasonics) and a final processing in a vapour/aerosol phase.

As can be seen, the apparatus consists of three distinctive sections. The first section 12 contains the fluorinated composition with its biocidal agents. A heating element 13 enables to increse the temperature for controlled vaporization of the sterilizing solution. A cooling jacket 14, in the upper portion of the processing unit condenses the vapors into a fog or aerosol phase 15. Some of the vapor condensates into the right side of the unit 16 which is at a lower temperature than the left side liquid 12. At the bottom of the right side compartment 16 are fastened several ultrasonic transducers 17 which irradiate the cooler condensed liquid.

For a complete cleaning sterilizing operation, the equipment to be processed is placed into a basket 18 made of perforated metal or plastic. The equipment basket is sucessively immersed in the hot fluorinated liquid 12 on the left side compartment then moved into the right side compartment 16 where it is submitted to both the cooler biocidal fluorinated agent and ultrasonics before a final stay in the vapor/aerosol phase 15. It is then lifted in the top area 19 where it is now ready to be removed in a dry and sterile condition.

To evaluate the sterilizing efficacy of the various liquids described in the present invention we used the official sporicidal test as described in the Bulletin (11th Edition, 1970) of the Association of Official Agricultural Chemists. The procedure was modified, where necessary, to conduct tests at temperatures other than 20°C. Spore carriers were placed in gauze bags as recommended in John S. Chen's paper entitled "Application of AOAC Sporicide Test in the Regulatory Testing of Commerical Products" (USDA, Pesticides Division, Washington, D.C. 1969). In some tests silk suture loops were attached to special hooks according to an improved procedure recently suggested by the Environmental Protection Agency. For the sake of simplicity we hereafter mainly reported the results obtained with *Clostridium sporogenes* ATCC 3584 on penicylinders and loops because they were the more difficult microorganisms to kill in our experiments.

In the following examples there are described several preferred embodiments to illustrate the invention. However, it should be understood that the invention is not intended to be limited to the specific embodiments.

Table I deals with series of tests conducted with the above mentioned AOAC sporicidal technique in apparatuses of the type shown in FIG. 1.

Several saturated dialdehydes known for their sporicidal activity (see R. M. G. Boucher et al, Proc. West. Pharm. Soc. 16:282–288, 1973) were dissolved in various concentrations in UCON 112 (a tetrachlorodifluoroethane manufactured by Union Carbide). The tests were conducted at a constant temperature (± 1°C) inside a 1 gallon capacity ultrasonic synergistic sterilizer activated with six ULTRABRAZE Langevin sandwich electrostrictive transducers. The average density of ultrasonic energy (nominal frequency 27 kHz) during processing was 20 watts/liter. Minimum and maximum ultrasonic energy density levels were respectively 15 watts/liter and 25 watts/liter. From the Table 1 one can see that the sporicidal chemicals which normally would kill the high concentration ($10^7$ spores per cc) of deposited dried vacuum spores in a few hours were shown to be effective most of the time in 60 minutes or less. A preferred concentration range of sporicidal agents in the fluorocarbon seems to lie between 0.2 and 3 per cent by weight. Very low concentration (i.e. below 0.01%) would apparently necessitate more than 1 hour for complete kill of *Cl. sporogenes* on loops when using an average ultrasonic energy level of 20 watts/liter at 37°C.

TABLE - I

Influence of Aldehyde Concentration
Fluorocarbon $CCl_2 FC Cl_2 F$ (molecular weight 203.85)
Ultrasonic field: Intensity: 20 watts/liter; nominal frequency 27 kHz
Temperature: 37°C

| Aldehyde | % Concentration in weight | 100% killing time for Cl. Sporogenes (ATCC 3584) on loops | |
|---|---|---|---|
| | | Without ultrasounds | With ultrasounds |
| Octanedial | 0.005 | 6 hours | 2 hours |
| Heptanedial | 0.01 | 5 | 1 " |
| Hexanedial | 0.02 | 4 | 1 " |
| Ethanedial | 0.2 | 4 | 30 minutes |
| Pentanedial | 0.5 | 3 | 20 " |
| Pentanedial | 1 | 3 | 30 " |
| Pentanedial | 2 | 3 | 20 " |
| Pentanedial | 3 | 2½ | 15 " |
| Iminodiacetaldehyde | 2 | 3 | 20 " |

TABLE II

Biocidal Efficacy of Various Fluoro or Perfluoro Chemicals
Biocidal Agent: Pentanedial (1% Concentration by Weight)

| Fluoro or Perfluoro Chemicals | | Temperature | Contact Time | AOAC Sporicidal Test Cl. sporogenes ATCC 3584 | |
|---|---|---|---|---|---|
| | | | | Rings | Loops |
| Freon TF | $CCl_2FC\,Cl\,F_2$ | 45°C | 2½ hr | 0/30 | 0/30 |
| UCON 112 | $CCl_2\,FC\,Cl_2\,F$ | 45°C | 2½ hr | 0/30 | 0/30 |
| UCON 112 | $CCl_2\,FC\,Cl_2\,F$ | 45°C | 1 hour | 0/30 | 0/30 |
| FREON MF | $C\,Cl_3\,F$ | 20°C | 15 hours | 0/30 | 0/30 |
| 50% Freon MF and TF | | 20°C | 15 hours | 0/30 | 0/30 |
| 50% Freon TF and UCON 112 | | 45°C | 2½ hr | 0/30 | 0/30 |
| Fluorinert* FC-77 | (mixture of fluorocarbons) | 90°C | 30 minutes | 0/30 | 0/30 |
| Fluorinert* FC-78 | (mixture of fluorocarbons) | 45°C | 2½ hr | 0/30 | 0/30 |
| Perfluorobutyltetrahydrofuran* FC-80 | $C_8F_{16}O$ | 37°C | 2 hours | 0/10 | (0/10 |
| Perfluorotributylamine* FC-47 | $(C_4F_9)_3N$ | 25°C | 14 hours | 0/10 | 0/10 |
| Perfluorodecalin (cis-trans)** PP-5 | | 37°C | 2½ hr | 0/10 | 0/10 |
| Perfluoromethyldecalin** PP-9 | | 37°C | 2½ hr | 0/10 | 0/10 |
| Perfluorodiisopropoxybutane*** P-11D | $C_9F_{20}O$ | 37°C | 2½ hr | 0/10 | 0/10 |
| Perfluoro (1,3 dimethyl) cyclohexane | | 37°C | 3 hours | 0/10 | 0/10 |
| Controls | | | | | |
| UCON 112 | | 45°C | 24 hours | 30/30 | 30/30 |
| Fluorinert FC-77 | | 90°C | 24 hours | 30/30 | 30/30 |

NOTE: The Freon solvents are manufactured by DuPont and the UCON solvents by Union Carbide.
*Indicates a product made by the 3M Company.
**Indicates a product made by the ISC Chemicals Ltd.
***Indicates a product made by the Allied Chemicals Corp.

Table II shows the sporicidal efficacy of various fluoro and perfluoro chemicals containing the same amount of biocidal agents (1,5 pentanedial, concentration 1% by weight). These tests were conducted without ultrasonic irradiation of the solution in which we immersed the contaminated AOAC type samples. It can be seen that as previously observed (G. Sierra, U.S. Pat. No. 3,697,222) for aqueous pentanedial solutions the higher the temperature the shorter is the sterilization time. The latter oscillates between 30 minutes and 15 hours when testing 13 different fluoro or perfluoro chemicals used alone or as a mixture. It is to be noted that control tests (fluoro or perfluorochemical alone) showed intense spores proliferation even after a 24 hour contact with the contaminated samples. The experiments with expensive perfluorochemicals (types used as blood substitute for total body washout - TBW) were conducted batchwise on single test sample inside a smaller container (250cc Beaker) equipped with a constant temperature system.

Table III shows six examples of tests conducted in the absence of any trace of water in commercial type fluorocarbons (manufactured by E. I. DuPont de Nemours and Co. Inc.) containing between 4 and 35% of standard non fluorated organic solvents. All these tests confirmed the sporicidal efficacy of formulas containing the same amount of 1,5 pentanedial. The seventh test with a Freon TWD 602 emulsion which contains 6% of water showed a poor sporicidal activity. This clearly shows that the formulas described in this application must not contain any trace of water to achieve the high sporicidal killing rate object of our invention. All the experiments described in Table III were conducted inside the same temperature range (35°C to 40°C) without the help of ultrasonic irradiation.

TABLE III

Biocidal Efficacy of Fluorocarbons Mixed with Organic Solvents
Biocidal agent: Pentanedial (2% conc. by weight)
Contact time: 2½ hours

| Fluorocarbon (commercial name) | Composition | % of Organic Solvent | Temp. | AOAC Sporicidal Test Cl. Sporogenes ATCC 3584 | |
|---|---|---|---|---|---|
| | | | | Rings | Loops |
| FREON TA | Freon TF + Acetone | 11% | 40°C | 0/30 | 0/30 |
| FREON TC | TF + Chloroform | 7% | 40°C | 0/30 | 0/30 |
| FREON TE | TF + Ethanol | 4% | 40°C | 0/30 | 0/30 |
| FREON TMC | TF + Methylene Chloride | 50% | 35°C | 0/30 | 0/30 |
| FREON T-E 35 | Blend Freon TF + Ethanol | 35% | 40°C | 0/30 | 0/30 |
| FREON TP 35 | Blend Freon TF + Isopropanol | 35% | 40°C | 0/30 | 0/30 |
| FREON TWD 602 | Emulsion of water (6%) in Freon TF | | 40°C | 5/30 | 10/30 |
| Control (no pentanedial) | Freon TF + Acetone | 11% | 40°C | 30/30 | 30/30 |

TABLE IV

Influence of Additives on Biocidal Efficiency

Biocidal Agent: Pentanedial (2% conc by weight)
Contact time: 2 hours
Temperature: 40°C
Fluorocarbon: Tetrachlorodifluoroethane

| Additive | Type | Concentration % in weight | AOAC Sporicidal Test B. subtilis Rings/Loops | | Cl. sporogenes Rings/Loops | |
|---|---|---|---|---|---|---|
| Non ionic | TERGITOL 15-S-12 | 0.1% | 0/30 | 0/30 | 0/30 | 0/30 |
| Anionic | DOWFAX 3B2 | 1% | 0/30 | 0/30 | 0/30 | 0/30 |
| Anionic | DOWFAX 3B2 | 2% | 0/30 | 0/30 | 0/30 | 0/30 |
| Cationic | Cetylpyridinium chloride | 1% | 0/30 | 0/30 | 0/30 | 0/30 |
| Pluronics | F-68 | 0.5% | 0/30 | 0/30 | 0/30 | 0/30 |
| None | | | 2/30 | 0/30 | 3/30 | 5/30 |

Table IV shows the beneficial effect of adding small quantities of certain chemicals, especially surface active agents, to the non aqueous fluoro or perflurochemicals containing a saturated dialdehyde. As previously noticed (R. M. G. Boucher et al, Proc. West. Pharm. Soc. 16:282–288, 1973) in the case of aqueous dialdehydes solution, a substantial increase in sporicidal activity is also observed with non aqueous dialdehydes formulations when adding chemicals of the following families: non ionic ethoxylates of isomeric linear alcohols, anionic diphenyloxide sulfonates, cationionic quaternary ammonium salts and Pluronic polyol surfactants which are members of a family of polyoxethylenepolyoxypropylene polymers.

Table IV clearly shows that the above mentioned biocidal synergistic additives are still effective at a concentration as low as 0.1% by weight and as high as 2% by weight. The efficacy of the biocidal synergistic additives will indeed be a function of their chemical reactivity, solubility, and wetting characteristics. Specific molecules such as those of the non ionic ethoxylates of isomeric linear alcohols or the octylphenoxypolyethoxyethanol (Triton X-100) which display some biochemical action of their own (Science, 505–507, Nov. 3, 1972) will indeed be more suitable to formulate active compositions with aldehydes and fluoro-perfluoro chemicals.

Table V shows the influence of the pH on two compositions made of 1% pentanedial by weight with a fluoro (Freon TF and TWD-602) and perfluorocarbons mixture (FC 80). Various buffering agents such as sodium bicarbonate, sodium carbonate, sodium hydroxide, triethanolamine or phthalate compounds were added to modify the pH of the formulation. As previously observed (see Am. J. Hosp. Pharm. 20:458–465, September, 1963) in the case of aqueous dialdehydes solutions high pH values will tend to favor the polymerization of the aldehydes thus decreasing the number of CHO radicals available for recombining with the critical radicals (amines for instance) in spores nucleotides or proteins.

TABLE V

Influence of pH on Biocidal Activity

Biocidal Agent: Pentanedial (1% concentration by weight)
Temperature: 37°C – 40°C
Contact time: 2½ hours

| Fluoro or PerFluorochemical | pH (Buffer) | AOAC Sporicidal Test (Cl. sporogenes ATCC 3584) Rings | Loops |
|---|---|---|---|
| FREON TF | 3 | 0/30 | 0/30 |
| FREON TF | 6 | 0/30 | 0/30 |
| FREON TF | 9 | 0/30 | 0/30 |
| FREON TF | 11 | 1/30 | 2/30 |
| FC - 80 | 3 | 0/30 | 0/30 |
| FC - 80 | 8 | 0/30 | 0/30 |
| Freon TWD 602 | 3 | 10/30 | 25/30 |

TABLE VI

Influence of Ultrasonics on Sterilization Rate

Temperature: 45°C
Contact time: 20 minutes

| Chemical Composition | Acoustic Energy Density | Frequency | AOAC Sporicidal Test B. subtilis Rings/Loops | | Cl. sporogenes Rings/Loops | |
|---|---|---|---|---|---|---|
| Fluorinert | 1 watt/liter | 27 kHz | 10/30 | 15/30 | 8/30 | 20/30 |
| FC-78 | 10 | 27 | 0/30 | 0/30 | 0/30 | 0/30 |
| + 1% Pentanedial | 25 | 27 | 0/30 | 0/30 | 0/30 | 0/30 |
| Perfluorochemical | 20 | 10 | 0/30 | 0/30 | 0/30 | 0/30 |
| FC 80 | 20 | 100 | 0/30 | 0/30 | 0/30 | 0/30 |
| + 1% Pentanedial | 20 | 250 | 0/30 | 0/30 | 0/30 | 0/30 |
| | 20 | 350 | 0/30 | 1/30 | 0/30 | 3/30 |
| UCON 112 | 15 | 27 | 0/30 | 0/30 | 0/30 | 0/30 |
| + 1% Ethanedial | 15 | 45 | 0/30 | 0/30 | 0/30 | 0/30 |

However, a wider pH range (3 to 9) than for aqueous solutions seems to provide satisfactory sporicidal action both with fluoro and perfluoro chemicals. All the experiments reported in Table V were conducted in the 37°C – 40°C range without the help of ultrasonic irradiation.

Table VI abstracts the results obtained with the full AOAC technique procedure (rings and loop carriers) when combining ultrasonic irradiation with the biocidal composition of our invention. One can see that ultrasonic energy considerably decreases the sterilization time as it was previously noticed when handling aqueous solutions (U.S. Pat. No. 3,697,222 and Pat. Appl. No. 155,233). From the data in Table VI one can conclude that ultrasonic energy slows down the polymerization of the active aldehyde radicals, accelerates the diffusion rate of the CHO radicals through the cortex of spores and may also sensitize the $NH_2$ groups or other reactive molecular regions in nucleo proteins or nucleic acids.

When operating at an energy level of 10 watts/liter in the liquid phase (irradiation frequency 27 kHz) one can see that complete sterilization is achieved in 20 minutes at 45°C. Table II shows that under identical conditions but without ultrasonic insonation the sterilization time is close to 2½ hours.

The results of the second series of tests (with FC 80) given in Table VI show that at constant ultrasonic energy level an increase in frequency will not affect the biocidal action until one reaches the region (above 350 kHz) where acceleration forces become predominant and amplitude motion very small. The last series of tests with UCON 112 and ethanedial confirms the fact that we do not have a too critically amplitude dependent phenomenom since no significant biocidal difference was observed when operating at two frequencies (27 and 45 kHz) in the high amplitude region.

Table VII shows the results of a series of experiments conducted with the equipment shown in FIG. 2 for sterilization in gaseous or aerosol phase. As previously explained, the apparatus shown in FIG. 2 contains the fluorinated biocidal composition in the two separate lower sections 12 and 16 of the apparatus. In the upper section 15 the vapour of the heated biocidal compositions is condensed thanks to a cooling coil shown in 14. The vapour phase 15 consists of an aerosol or dispersed liquid phase made of fine droplets whose diameters range from 100 to 1 microns with an average peak of the droplets distribution in the 5 to 8 microns region.

To assess the biocidal efficiency of the compositions of our invention in the aerosol phase, we loaded a surgical instruments perforated basket with various tools and muslin rolls. The basket was fastened in a fixed position mid distance between the upper level of the liquid and the visible interface between the condensed fog and the surrounding atmosphere.

Inside the basket loaded with instruments we placed, at various positions (including inside the core of muslin rolls), 20 SPORDEX bacterial spores strips. The *Bacillus subtilis* population of each strip was said to average 100,000. Since each package of SPORDEX contained three strips, two were used for our test and the third one was always kept as a reference. After processing in the aerosol or vapour phase the spore strips were removed and under sterile conditions were individually placed in labelled test tubes, each containing 25 cm³ cm³ of sterile fluid thioglycollate medium. The control strips left unsterilized, were also placed into test tubes containing the same medium. Table VII gives the results of our tests after 168 hours of incubation. The temperature mentioned in Table VII are average temperatures taken with a thermistor on the metal walls of the loaded basket.

TABLE VII

Sterilization Tests in Fog or Aerosol Phase
B. Subtilis SPORDEX Strips

| Chemical Composition | Biocidal Agent | AEROSOL PHASE Temp. in | Contact Time | Number of Test Tubes with Growth | Number of Control Test Tubes with Growth |
|---|---|---|---|---|---|
| Fluorinert (FC-78) | Pentanedial (2%) | 37.8°C | 2½ hours | 2/20 | 10/10 |
| Fluorinert (FC-78) | " | 37.8°C | 3½ hours | 0/20 | 10/10 |
| Fluorinert (FC-78) + 0.1% TERGITOL 15-S-12 | Pentanedial (2%) | 37.8°C | 2½ hours | 0/20 | 10/10 |
| | " | 37.8°C | 3½ hours | 0/20 | 10/10 |
| FREON TE | Pentanedial (2%) | 35°C | 2½ hours | 3/20 | 10/10 |
| | " | 35°C | 3½ hours | 0/20 | 10/10 |
| FREON TE (TF + 4% Ethanol) with 0.5% F68 Pluronics | Pentanedial (2%) | 35°C | 2½ hours | 0/20 | 10/10 |
| | " | 35°C | 3½ hours | 0/20 | 10/10 |
| FREON TF | Methanal (8%) | 35°C | 5 hours | 1/20 | 10/10 |
| | | 35°C | 6 hours | 0/20 | 10/10 |

As can be seen from the tests with a perfluorocarbon formulation, a non ionic additive gives more potency to the biocidal composition. This indeed only confirms the trend previously observed (see Table IV) when processing in liquid phase. The tests with a fluorocarbon (FREON TE) mixed with an alcoholic solvent also show the advantage of additives of the polyols surfactant family. The last test conducted with a fluorocarbon (FREON TF) containing a substantial amount of methanal also shows the possibility of sterilization in aerosol phase when the processing time is of the order of several hours. We, however, must stress that the experiments with *B. subtilis* SPORDEX spores cannot be truly compared with the AOAC vacuum dried spores experiments. Longer times would of course be needed to reach complete sterility when one replaces the "wet" SPORDEX spores by the vacuum dried spores all other things being equal.

Another application of the formulas object of our invention is their therapeutic use for topical treatment of skin diseases dermatophytosis, for instance) caused by fungi, bacterial spores or viruses. The therapeutic treatment takes place in an apparatus similar to the one described in FIG. 1 after removal of the upper lid. The sick limb, foot or part of the body, is immersed into the biocidal fluorinated solution 2 contained in the left side of the apparatus shown in FIG. 1.

*Tinea Pedis* (commonly called Athlete's Foot) is one of the most prevalent dermatophytoses. The toe webs are infected with a Trichophyton species or with *Epidermophyton floccosum*. Initially there is itching between the toes and the development of small blisters which rupture and discharge a thin fluid. The skin of the toe webs becomes macerated and peels, whereupon cracks appear which are prone to secondary bacterial infection. When secondary infection does occur lymphangitis and lymphadenitis develop. When the fungous infection becomes chronic, peeling and cracking of the skin are the principal manifestations. Sometimes the nails become brittle, thickened, yellow, and irregular (*tinea unquium*).

Several severe cases of *Tinea Pedis* have been successfully cured by a daily 10 minute exposure (foot immersion) in a non toxic biocidal composition during a consecutive 25 day period. When combining ultrasonic irradiation with the exposure to the biocidal fluorinated formulation, complete cure can be achieved within a shorter time period (15 days) or with the same length of time but with reduced daily exposure (5 minutes).

Two very effective formulations used against Athlete's Foot consisted of a mixture of trichloromonofluoromethane with 1,5 pentanedial (0.5 to 1 per cent by weight) and a mixture of perfluorobutyltetrahydrofuran with 1% by weight of ethanedial and 0.5% of $NaHCO_3$ as a buffer agent. All the treatment with ultrasonics were conducted at an intensity close to or slightly below the cavitation threshold of the solution. The nominal irradiation frequency was comprised between 20 and 30 kHz. During the therapeutic treatments the temperature of the solution was maintained in the 22°C to 37°C limit according to the boiling point of the solution.

It is indeed obvious that within the scope of our invention numerous objects and instruments such as electronic equipment used in tropical areas could be rid of fungi or other parasitic sporulated microorganisms which proliferate on plastics, organic materials or metals.

Another possible therapeutic use of the compositions object of our invention is in the medical procedure called Total Body Washout (TBW). As is well known (Medical Products Salesman, 32–35, November, 1973) same of the perfluorochemicals used in our formulations have been substituted for blood when a patient was in critical condition due to heavy damage of his liver by the hepatitis virus (Col G. Klebanoff procedure, Wilford Hall Medical Center, Lackland Air Force Base, San Antonio, Texas). The non toxic perfluorocarbon compositions can supply oxygen transport and, in conjunction with a simulated blood serum, perform many functions of whole blood.

One of the liver's many vital functions is to cleanse the blood of certain poisonous wastes. When the organ is overwhelmed by the toxins, coma results with death usually following. The liver has great regenerative power, however, and it can sometimes resume normal operation if its functions are temporarily relieved. In a TBW procedure, the patient's blood is drained out and the perfluorocarbon composition is pumped through his body, washing his vessels clean of infected blood. During the wash out, which lasts approximately 30 minutes, the patient's heart and brain show no activity and his temperature drops to about 23.9°C. A mechanical respirator takes over the patient's breathing. The washout continues until the solution shows no sign of any red blood cells. Then 12 units of fresh whole blood, the amount a healthy adult has in his body, are gradually infused into the patient. This new procedure succeeded with nine patients among 25 treated in the past two years. It is our contention that perfluorocarbon compositions of the type described in this application could be used for the TBW procedure to shorten the critical time during which the perfluorocarbons are used. The amount of biocidal aldehydes or dialdehydes should be reduced to a percentage by weight lower than 0.05%. The strong biocidal action displayed above 20°C should insure complete elimination of disease causing viruses and microorganisms and should leave, after treatment, infinitesimal aldehydes traces which would not cause side effects. This method would insure no post-treatment growth and duplication of hard to kill viruses. Another recent procedure successfully tried on laboratory animals involves adding perfluorocarbons to the bloodstream instead of taking blood out. This method is indeed more delicate because it involves a tremendous expansion of the blood volume. The hope behind this work is to develop better X-ray therapy for cancer. Since tumors are oxygen sensitive, the more oxygen in the tumor cells the easier it is to kill them with X-rays. Here again the use of the compositions of our invention could synergistically accelerate the destruction of tumors since it is well established that (R. M. G. Boucher, U.S. Pat. Appl. No. 155,233) pentanedial, for instance, is virucidal per se. Research is continuing to assess the level of saturated dialdehydes which will not coagulate blood protein while providing quick destruction of various forms of Herpes Simplex viruses. It has indeed been established that sporicidal action of vacuum dried spores (AOAC type) automatically insures complete destruction of both hydrophilic and lipophilic viruses.

While the invention has been described by means of specific examples and in a specific embodiment, it is not limited thereto, for obvious modifications will occur to those skilled in the art without departing from the spirit or scope of the invention.

We claim:

1. A gas or liquid phase essentially non-aqueous composition for simultaneously cleaning and sterilizing of inanimate objects or animate surfaces consisting essentially of 0.005% to about 3% of at least one aldehyde selected from the group consisting of methanal, ethanedial, malonaldehyde, succinaldehyde, glutaraldehyde, adipaldehyde, heptanedial, octanedial, and iminodiacetaldehyde; and a fluoro or perfluoro chemical as active ingredients.

2. The composition of claim 1 wherein the active ingredients are mixed with other organic solvents.

3. The composition of claim 2 wherein the organic solvents consist of at least one member of the group consisting of acetone chloroform, denatured ethyl alcohol, methylene chloride, denatured ethyl alcohol and isopropyl alcohol.

4. The composition of claim 1 where the liquid or gaseous fluorocarbon chemicals consist of at least one member of the group consisting of pure perfluorocarbons, trichloromonofluoromethane, tetrachlorodifluoroethane and trichlorotrifluoroethane in any proportion of these chemicals.

5. The compositions of claim 1 where the liquid or gaseous perfluoro chemicals consist of at least one member of the group consisting of perfluorobutyl-tetrahydrofuran, perfluorobutylamine, perfluorodecalin, perfluoromono and di methyldecalin, perfluorodiisopropoxybutane and perfluoro (1-3 di-methyl) cyclohexane.

6. The compositions of claim 2 wherein the organic solvent is only one member of a group and present in the following amounts of solvent selected from the group consisting of 11% acetone, 7% chloroform, 4% denatured ethyl alcohol, 50% methylene chloride, 35% denatured ethyl alcohol, and 35% isopropyl alcohol.

7. The compositions of claim 1 where the liquid or gaseous fluorocarbon or perfluoro chemical contains less than 1% of a surfactant chosen among the anionic, non ionic, cationic families or the polyoxethylene-poly oxypropylene-polyols.

* * * * *